(12) United States Patent
Shibahara (10) Patent No.: US 6,549,260 B1
(45) Date of Patent: Apr. 15, 2003

(54) LIQUID CRYSTAL DISPLAY DEVICE OF LATITUDINAL ELECTRIC FIELD TYPE HAVING PROTRUDED SPACER COVERS COMMON LINE

(75) Inventor: Hideo Shibahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/533,483

(22) Filed: Mar. 23, 2000

(30) Foreign Application Priority Data

Mar. 26, 1999 (JP) .......................................... 11-084893

(51) Int. Cl.⁷ ...................... G02F 1/1339; G02F 1/1343
(52) U.S. Cl. ......................................... 349/155; 349/141
(58) Field of Search .................................. 349/155, 141

(56) References Cited

U.S. PATENT DOCUMENTS

| | | | | |
|---|---|---|---|---|
| 6,097,467 A | * | 8/2000 | Fujimaki et al. | 349/155 |
| 6,317,188 B1 | * | 11/2001 | Shibahara | 349/155 |
| 6,411,360 B1 | * | 6/2002 | Matsuyama et al. | 349/156 |
| 6,433,852 B1 | * | 8/2002 | Sonoda et al. | 349/156 |

FOREIGN PATENT DOCUMENTS

| | | | |
|---|---|---|---|
| JP | 1-265231 | | 10/1989 |
| JP | 06-214244 | | 8/1994 |
| JP | 10-48636 | * | 2/1998 |
| JP | 2751392 | | 2/1998 |
| JP | 10-048636 | | 2/1998 |
| JP | 10-82909 | | 3/1998 |
| JP | 10-104606 | | 4/1998 |
| JP | 10-325965 | | 12/1998 |
| JP | 11-002717 | | 1/1999 |
| JP | 11-030784 | | 2/1999 |
| JP | 2000-035590 | | 2/2000 |
| JP | 2000-227599 | | 8/2000 |
| KR | 1994-0015584 | | 7/1994 |

* cited by examiner

Primary Examiner—Toan Ton
Assistant Examiner—Mike Qi
(74) Attorney, Agent, or Firm—Katten Muchin Zavis Rosenman (57) ABSTRACT

In an active matrix liquid crystal display device of a latitudinal electric field type, i.e., of an In-Plane-Switching type, a protruded spacer is formed on one of a color filter substrate and a TFT substrate, and the spacer is positioned only at a location over a common electrode wire or over a portion of a pixel electrode extended over a gate electrode wire, to thereby reduce the occurrence of a long-term afterimage phenomenon.

9 Claims, 7 Drawing Sheets

LIQUID CRYSTAL DISPLAY DEVICE OF LATITUDINAL ELECTRIC FIELD TYPE HAVING PROTRUDED SPACER COVERS COMMON LINE

BACKGROUND OF THE INVENTION

1. Field of the Invention

The present invention relates to a liquid crystal display device, and particularly to a spacer arrangement of a liquid crystal display device of a latitudinal electric field type.

2. Description of the Prior Art

Recently, liquid crystal display (LCD) devices have been widely used for display terminals of various information instruments, making use of beneficial characteristics of the LCD devices such as light weight, thinness and a reduced power consumption. Typically, most of these LCD's are of TN (twisted nematic) and STN (super twisted nematic) types. Such conventional longitudinal electric field type LCD's have been put to practical use, but have a problem of a relatively narrow viewing angle. As such, there has been proposed an LCD of a latitudinal electric field type, i.e., an In-Plane-Switching (IPS) type.

Such an LCD of IPS type is disclosed in U.S. Pat. No. 5,995,186 issued on Nov. 30, 1999. In this LCD, pixel electrodes and common electrodes are formed on a thin film transistor (TFT) substrate. Both electrodes are formed in comb-teeth shapes, and arranged to oppose to each other via insulation layer. No electrodes are formed on a color filter (CF). Spacers of small particles are arranged and a liquid crystal is sealed, between the TFT substrate and the CF substrate.

Since such an IPS type of LCD has a wider viewing angle, there is an increased demand as a substitution for a conventional CRT display. However, one of the problems in adopting small particles as spacers is that it is not determined as to what positions (in-plane positions) the particles are arranged at, upon adopting general dispersing means. If a spacer such as a plastic bead is positioned on a pixel, the display quality of the liquid crystal display element is degraded due to scattering and transmission of light by the spacer. There is another defect that the spacer has a spherical shape which contacts at points upon cell pressing, which leads to damage of an alignment film and a transparent electrode, tending to occurrence of a display defect. There is a further defect that the liquid crystal is contaminated and its resistant voltage is lowered due to damage of the alignment film and transparent electrode. Moreover, since it is required to provide a process for uniformly dispersing the spacers and to control a particle size distribution of the spacers at a high precision, it has been difficult to obtain a stable display quality with a simplified manufacturing method.

In Japanese Patent Application Laid-Open No. HEI-10-48,636 (48,636/1998) laid open on Feb. 20, 1998, there is disclosed an IPS type of LCD for solving such a problem. In this improved LCD, a columnar spacer laminated with color filters is provided on a CF substrate, instead of adopting a small particle as a spacer. The spacer formed in such a structure eliminates a necessity of additional process in a conventional manufacturing process for a color filter, thereby providing an advantage that the color filter can be fabricated at a cost equal to the conventional one.

Further, in this improved LCD, the spacer position is limited to an intersection between a data line (drain electrode wire) and a scan line (gate electrode wire) in view of avoiding a rubbing inferiority. However, there has been found such a problem that a long-term afterimage phenomenon tends to occur when the spacer is arranged over the data line or the scan line having a high potential. This phenomenon means a situation where a certain pattern displayed in a bright state for a long time fails to return to its fully dark initial state and rather exhibits a pattern seizure or sticking, even when it is tried to return the pattern as noted.

SUMMARY OF THE INVENTION

It is therefore an object of the present invention to provide an active matrix type LCD (AM-LCD) of an IPS type capable of reducing the occurrence of such a long-term afterimage phenomenon.

The liquid crystal display device of a latitudinal electric field type of the present invention is characterized in that a forming position of a protruded spacer is limited to over a common electrode wire or an extended portion of a pixel electrode, to thereby reduce the occurrence of the aforementioned long-term afterimage phenomenon.

According to one embodiment of the present invention, a first substrate as a TFT substrate is provided with, for each of a plurality of pixels arranged in a matrix, a gate wire arranged at one side of a periphery of the pixel, a drain wire arranged perpendicularly to the gate wire at another side of the periphery of the pixel, a common electrode wire arranged at the other side of the periphery of the pixel in parallel with the gate wire, a common electrode extended from the common electrode wire perpendicularly to this common electrode wire, and a pixel electrode arranged in parallel with the common electrode in a mutually spaced manner. A second substrate provided with a color filter is arranged so as to oppose the first substrate and a liquid crystal layer is sealed into a gap formed between the first substrate and the second substrate by means of a spacer. The spacer comprises a protruded portion provided on at least one of the first substrate and the second substrate, and that a contact portion, at which the first substrate and the second substrate contact each other via the protruded portion, is located on at least one of the common electrode wire and an extended portion of the pixel electrode.

The liquid crystal display device is also characterized in that the common electrode is plural, the extended portions of the pixel electrode are formed to overlap with the common electrode wire, and the contact portion is located over the extended portions of the pixel electrodes.

Further, the liquid crystal display device is characterized in that the pixel electrode is plural, portions of respective adjacent pixel electrodes are formed to overlap with the common electrode wire, and the contact portion is located between the adjacent pixel electrodes and over the common electrode wire.

Moreover, the liquid crystal display device is characterized in that a portion of the pixel electrode is formed to overlap with a gate wire of an adjacent pixel in the extended direction, and the position of the contact portion is located over the overlapped position.

DETAILED DESCRIPTION OF THE PREFERRED EMBODIMENTS

Figure 1:
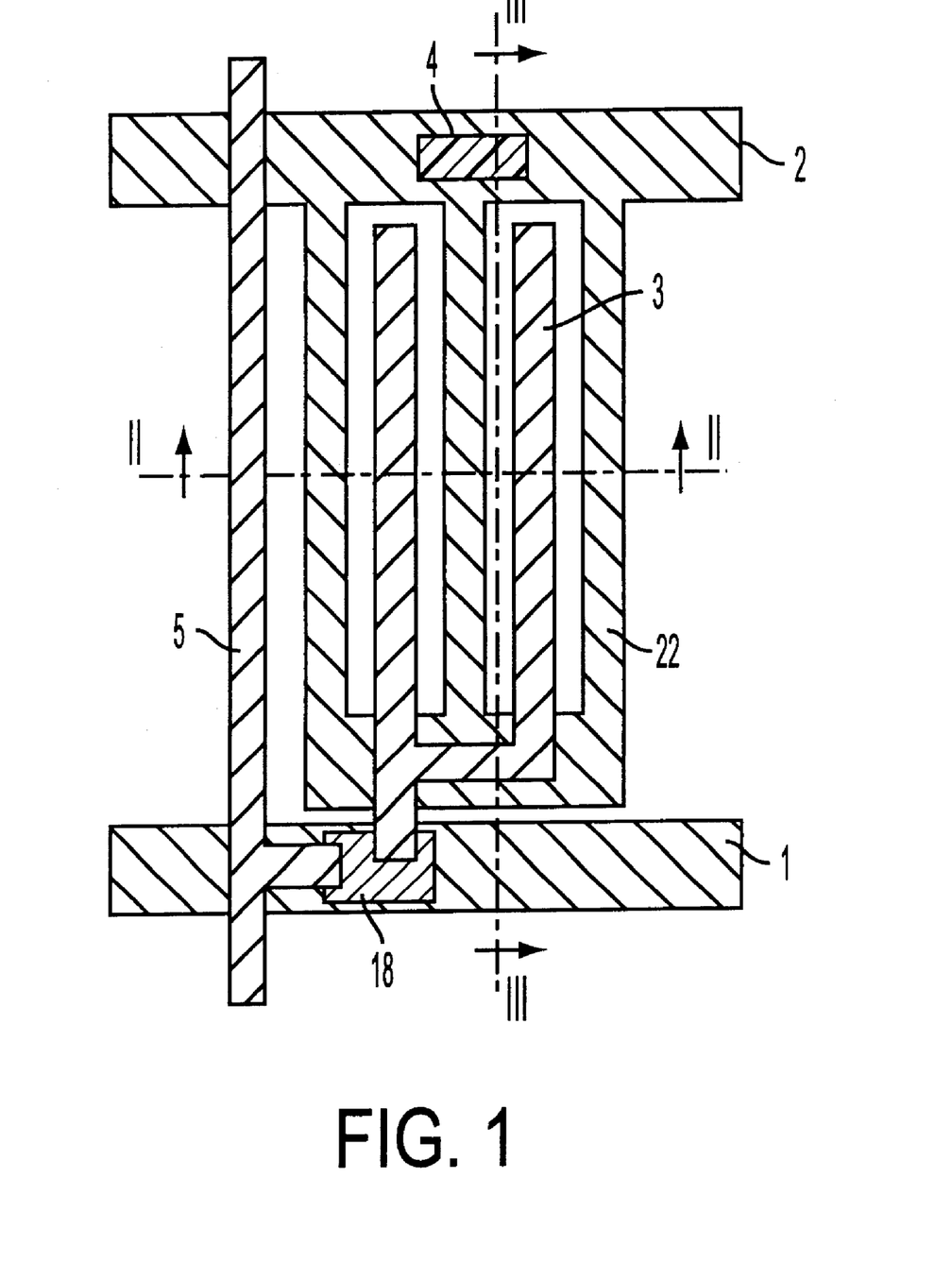
FIG. 1 is a plan view showing an electrode structure within a unit pixel of an active matrix liquid crystal display device according to a first embodiment of the present invention.
Figure 2:
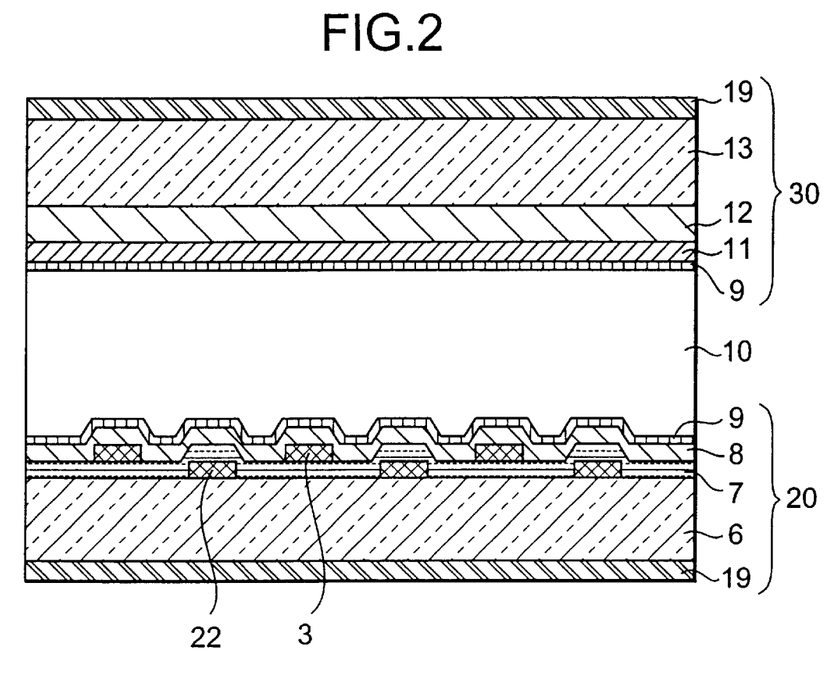
FIG. 2 is a sectional view taken along a line A—A of FIG. 1.
Figure 3:
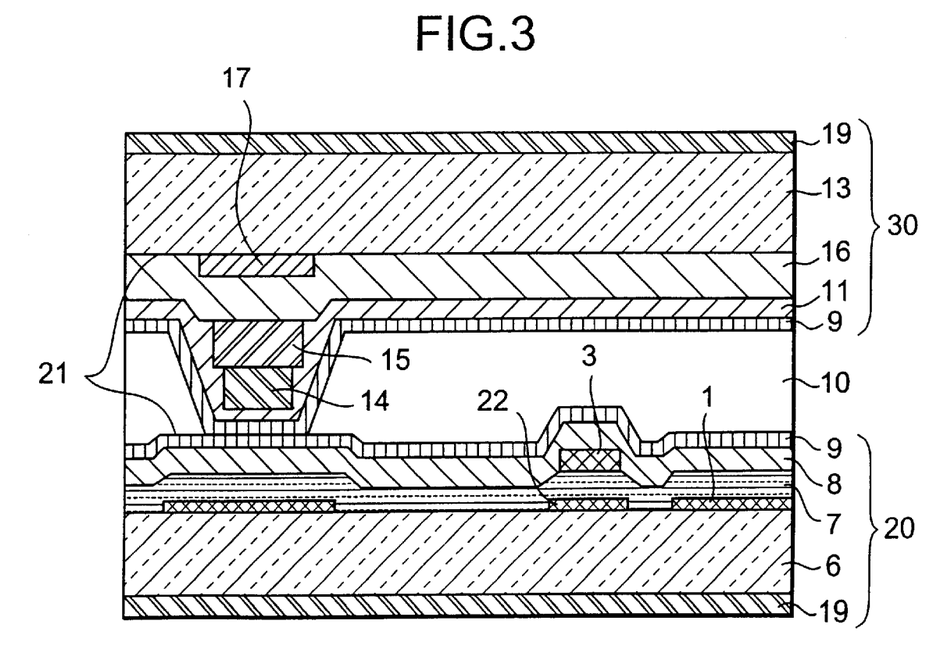
FIG. 3 is a sectional view taken along a line B—B of FIG. 1.

Referring FIG. 1 to FIG. 3, an active matrix liquid crystal display device of a latitudinal electric field type, to which the present invention is applied, is described.

As shown in FIG. 1 and FIG. 3, a tip end of a protruded portion 21 constituting a spacer is formed on a substrate 13 provided with a color filter (CF) such that the tip end is located over a common electrode wire 2 formed on a TFT substrate 6. In FIG. 1, reference numeral 4 designates an area where the spacer contacts the TFT substrate 6 formed with a thin film transistor (TFT) 18.

On the TFT substrate 6, there are formed on the same plane a gate electrode wire 1 as a scan line, and a common electrode wire 2 connected to a common electrode 22 in a lattice shape. On these electrodes, there are formed semiconductor layers constituting the TFT 18 via gate insulating film 7, and there are formed a drain electrode wire 5 as a data line to be connected to one of the source and drain areas of this TFT, such as a drain, and a pixel electrode 3 in a comb teeth shape connected to the other of the source and drain areas of the TFT, such as a source. The pixel electrode 3 is arranged between three pieces of common electrodes 22. There is formed a storage capacitor by a structure interposing the gate insulating film 7 between the pixel electrode 3 and the common electrode 22. An insulating film of a silicon nitride film 8 is formed on the drain electrode wire 5, pixel electrode 3 and TFT 18, as a protection film. Then an alignment film 9 is formed thereon. As the alignment film 9, there is adopted a polyimide, for example, which is subjected to a rubbing treatment on its surface for aligning the liquid crystal.

One concrete example of the electrodes on the TFT substrate includes the following dimensions. Pixel pitches are 100 μm in a latitudinal direction (i.e., between respective drain electrode wires 5) and 300 μm in a longitudinal direction (i.e., between respective gate electrode wires 1). Concerning the widths of the aforementioned electrodes, the gate electrode wire 1, the drain electrode wire 5 and the common electrode wire 2 are settled to be wider so as to avoid a line defect. These widths are 10 μm, 7 μm and 7 μm, respectively.

On the other hand, the pixel electrode 3 independently formed for one pixel unit and the common electrode 22 in the lattice shape have slightly narrowed widths, respectively, at their portions extending in the longitudinal direction, i.e., 4 μm and 5 μm, respectively. Since the widths of these electrodes are narrowed, there is increased a possibility of wire breakage due to an impure ingredient. Nonetheless, such ingredient may only lead to a partial lack of one pixel, and will never lead to a line defect. Between the pixel electrode 3 and the common electrode 22, there is a gap of 10 μm via insulating film. The number of pixels are 1024× 3×768, by providing 1024×3 (R, G, B) lines of signal wire electrodes and 768 lines of scan wire electrodes.

On the CF substrate 13 opposing to the TFT substrate 6, a black matrix layer (BM) 17 is formed for blocking light leaked from those portions other than display portions, and a color filter having color layers of red, blue and green (green color layer 16 in FIG. 3). Furthermore, on the color layer, an overcoat 11 such as acrylic resin for preventing impurities from solving out of the color layer. And then, this overcoat 11 is coated with a polyimide as the alignment film 9 to be subjected to a rubbing treatment as stated above.

Figure 4:
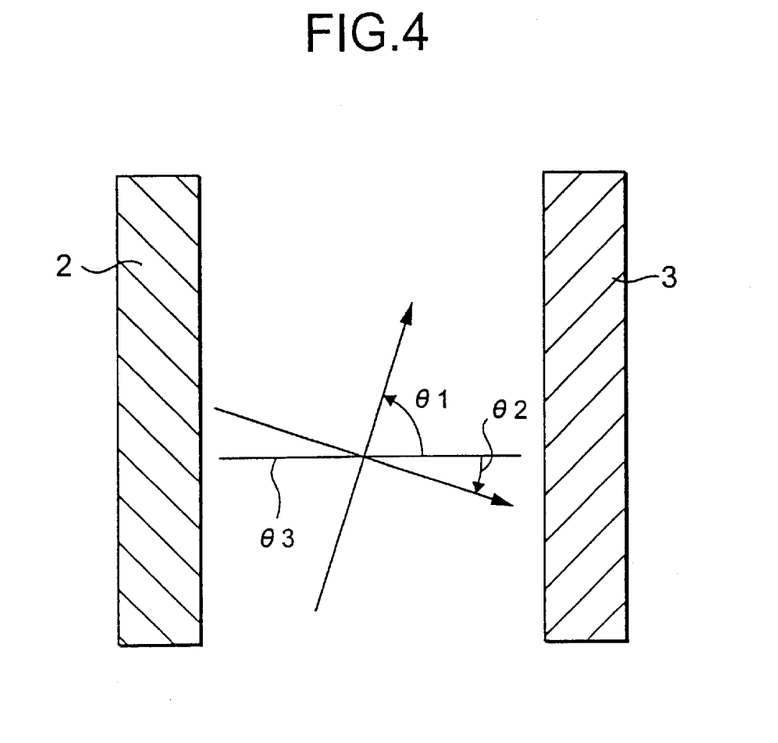
FIG. 4 is a plan view explaining a rubbing direction of an alignment film.

Both of the alignment films 9 are provided with mutually parallel rubbing directions. As shown in FIG. 4, these rubbing directions have an angle θ1 of 75 degrees relative to a direction θ3 of an electric field to be applied. As for the TFT substrate 6 and the CF substrate 13, glass plates are used as transparent substrates, each having a thickness of 1.1 mm and a polished surface. Between these substrates, there is interposed a nematic liquid crystal composition having a positive dielectric anisotropy Δε having a value of 7.3, and a refraction anisotropy of 0.074 (at 589 nm, 20° C.), to thereby constitute a liquid crystal panel.

In this case, the gap "d", i.e., the thickness of the liquid crystal layer, is maintained by the spacer 21 in a protrusion shape such as a columnar one formed by laminating the color layers of green, blue and red on the BM layer 17 on the CF substrate 13, and the gap "d" is set to be 4.0 μm when the liquid crystal is filled therein. The position at which the top of the protruded spacer 21 contacts the TFT substrate side is the area which is shown as a spacer contact portion 4 over the common electrode wire 2 in FIG. 1. This spacer contact area is to be formed so as not to extend beyond the outer periphery of the common electrode wire 2, and it is also desirable to set the maximum dimension of the spacer contact area to be equal to or smaller than an extent of the distance between adjacent pixel electrodes 3 as shown in FIG. 1, from a rubbing treatment view.

The liquid crystal panel having the above described structure is interposed between two sheets of polarizing plates 19 (for example, G1220DU manufactured by NITTO DENKO Co., Ltd.) to thereby constitute a liquid crystal display device. Furthermore, as shown in FIG. 4, one of the polarizing plates has a transmission axis of polarization set at θ1=75°, and the other has a transmission axis of polarization set at θ2=−15° perpendicular to that of the former.

Figure 5A:
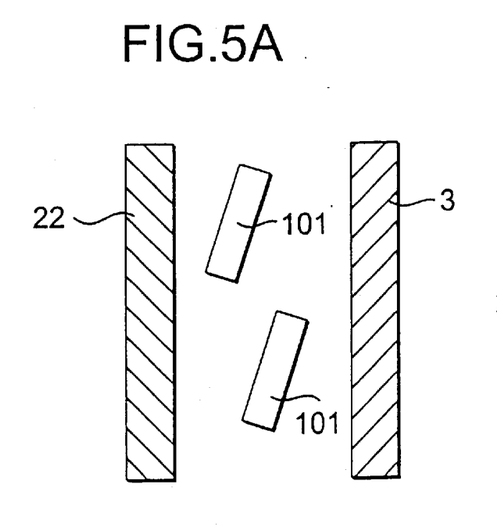
FIG. 5A is a schematic view explaining an aligned direction of a liquid crystal in a dark state.
Figure 5B:
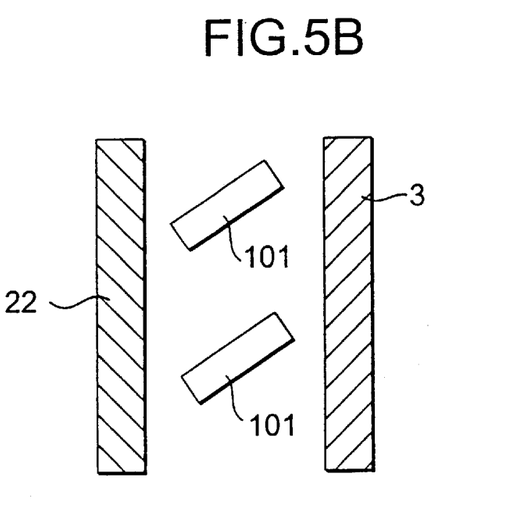
FIG. 5B is a schematic view explaining an aligned direction of a liquid crystal in a bright state.

When the aforementioned liquid crystal display device is controlled by adopting a normally closed characteristic by which the liquid crystal display device takes a dark state at a low voltage ($V_{OFF}$) and a bright state at a high voltage ($V_{ON}$), its liquid crystal molecules 101 are aligned to thereby produce the dark state and bright state, respectively, as shown in FIG. 5. Namely, in the dark state, the liquid crystal molecules 101 are arranged to align in the rubbing direction as shown in FIG. 5A. By the effect of the aligned direction of the liquid crystal molecules and the two sheets of polarizing plates, the display device is controlled to the dark state. In the bright state as shown in FIG. 5B, the liquid crystal molecules 101 are aligned into a direction rotated from the rubbing axis by certain degrees, by an applied electric field. In this way, the display device is controlled to the bright state.

The aforementioned problem of the long-term afterimage phenomenon in the conventional LCD of the IPS type is caused by the fact as follows. Since a high voltage is generated between the common electrode 22 and the pixel electrode 3 in the bright state, there is accumulated an electric charge within a liquid crystal capacitance, i.e., a capacitor existing between the common electrode 22 and the pixel electrode 3, after a long term display in the bright state. And the display device is not brought back to the complete dark state due to the accumulated electric charge, even when the display device is controlled so.

Figure 6:
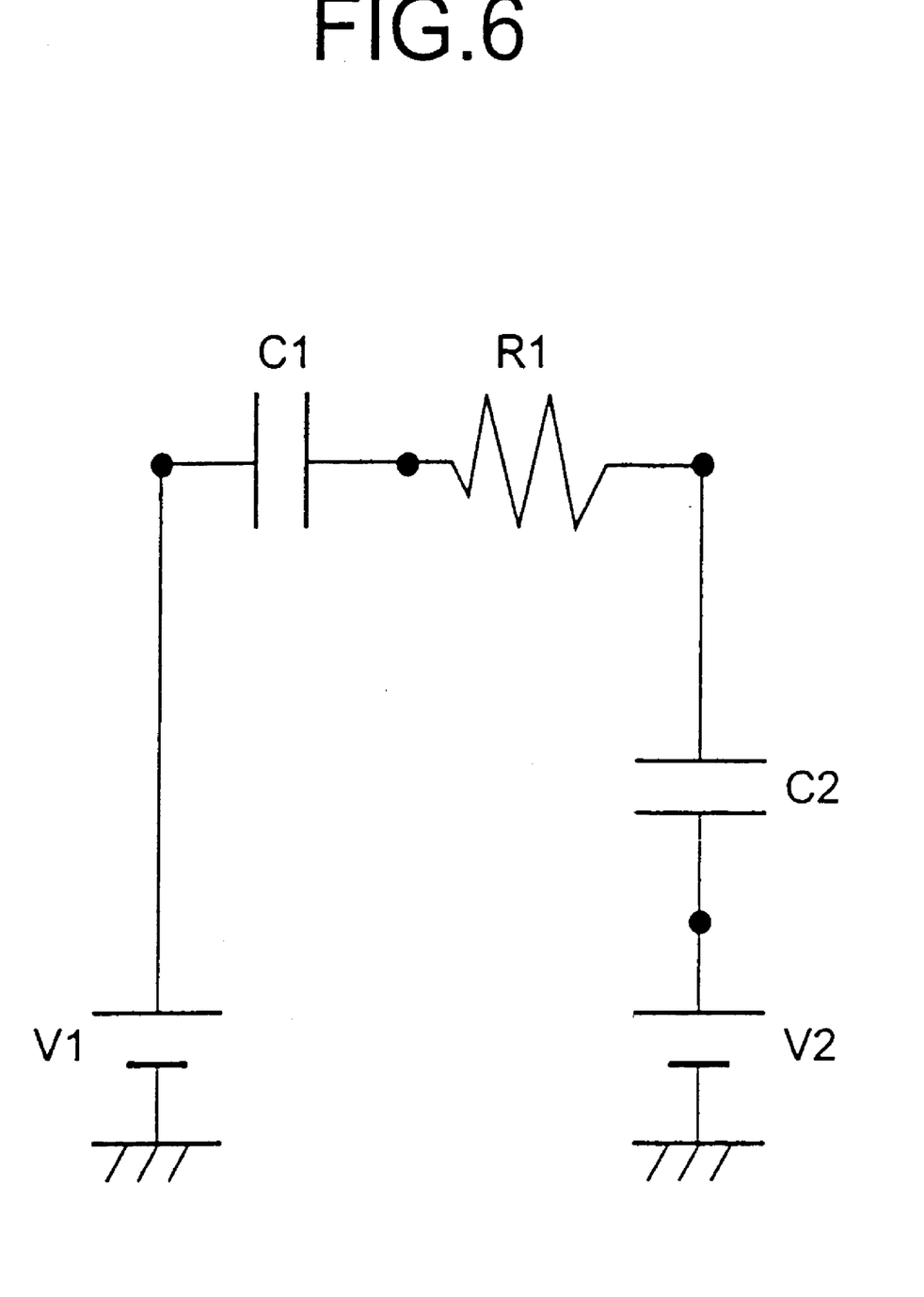
FIG. 6 is a view showing an equivalent circuit when a correlation between the pixel electrode and the common electrode is regarded as an electric circuit.

Explaining this phenomenon making use of an equivalent circuit of FIG. 6, V1 represents a voltage between the pixel electrode 3 and the common electrode 22, C1 represents a capacitance of a liquid crystal between the pixel electrode 3 and the common electrode 22, V2 represents a voltage between the color filter substrate and the TFT substrate, C2 represents a capacitance between the color filter substrate and the TFT substrate, and R1 represents a resistance between the color filter substrate and the TFT substrate. In this case, the value of R1 is determined by a resistance of the protruded spacer 21, and V2 is determined by a potential at a position at which the protruded spacer 21 contacts the TFT substrate. Normally, an electric charge Q, to be accumulated when a certain pattern is displayed for a long time in the bright state, is determined by the following equation (1); thus, the smaller the potential difference between V1 and V2, the smaller the electric charge to be accumulated, so that the long-term afterimage phenomenon is rarely caused:

$$Q=1/(1/C1+1/C2) \times (V1-V2) \quad (1)$$

Since V2 is determined by a potential at a position at which the protruded spacer 21 contacts the TFT substrate, the position of the protruded spacer 21 is important. Conventionally, as a direct current component in case of displaying a white, V1=0V due to application of a ±5V amplitude, and V2=−10V since the protruded spacer 21 contacts the TFT substrate over the gate wire. In this case, the equation (1) can be evaluated as the following equation (2):

$$Q=1/(1/C1+1/C2) \times (0-(-10))=1/(1/C1+1/C2) \times 10 \ [C] \quad (2).$$

However, in the present embodiment, the position at which the top of the protruded spacer 21 contacts the TFT substrate is the spacer contact portion 4 over the common electrode wire 2 of FIG. 1. Thus, V2=0 V, so that the electric charge to be accumulated is given by the following equation (3) which means that no electric charges Q are accumulated and no long-term afterimage phenomena are caused:

$$Q=1/(1/C1+1/C2) \times (0-0)=0 \ [C] \quad (3).$$

Figure 7:
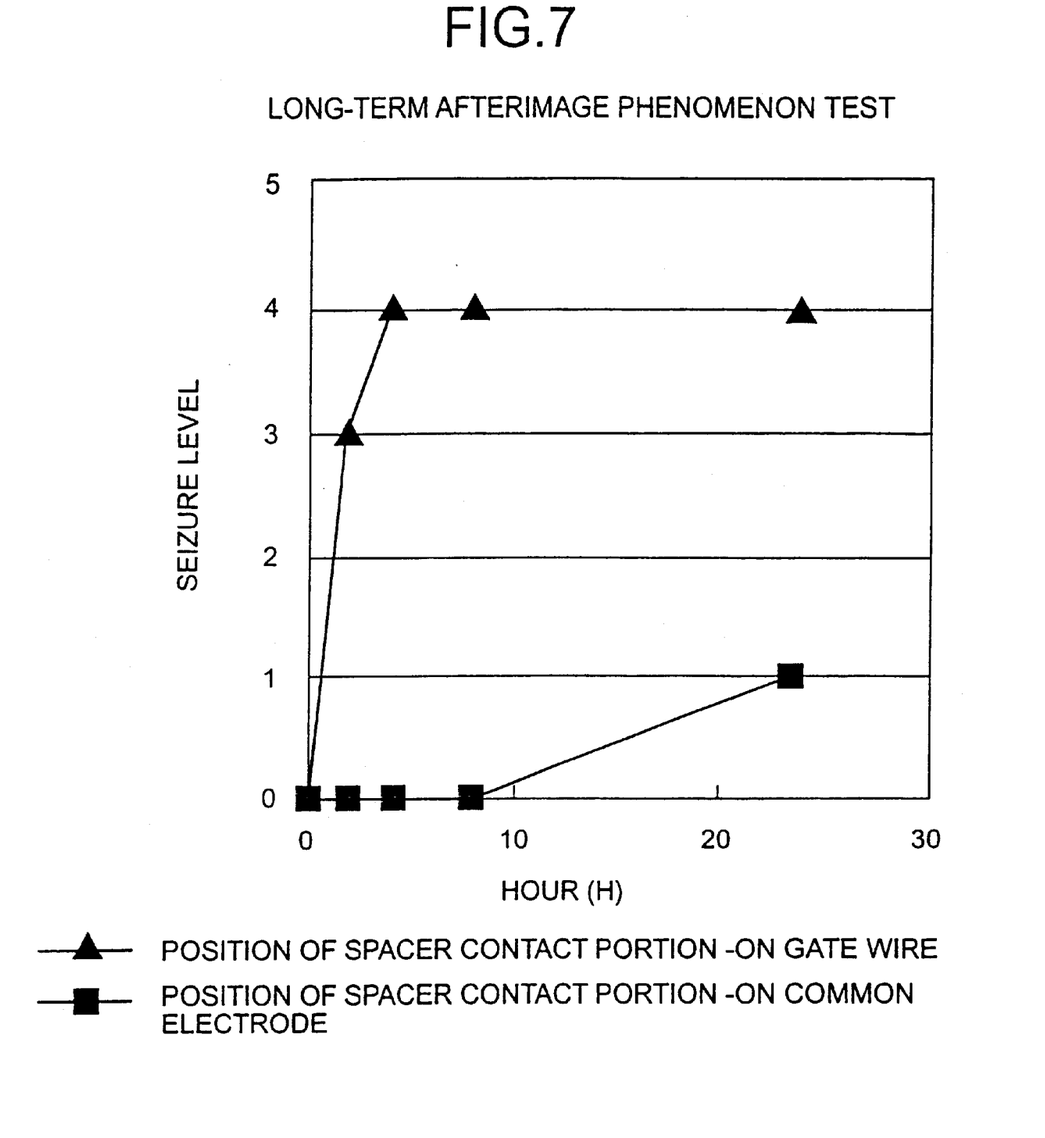
FIG. 7 is a graph showing a relationship between a period of time and a way in which a long-term afterimage phenomenon is seen, when a rectangular white/black pattern has been displayed for a long time.

FIG. 7 is a graph showing a relationship between a period of time and a way in which a long-term afterimage phenomenon is seen, when a rectangular white/black pattern has been displayed for a long time. The abscissa represents a period of time and the ordinate represents a seizure degree. Four levels including, from a minor or slight one, 0 representing "none", 1 representing "obliquely recognizable", 2 representing "blurrily recognizable from the front", 3 representing "clearly recognizable from the front", and 4 representing "NG", indicate the seizure degree. As shown in FIG. 7, when the position of the protruded spacer is over the gate wire, even the displaying for 2 hours causes seizure. However, when the position of the protruded spacer is over the common electrode, no seizures are caused until 8 hours, and seizure is caused even by the displaying of 24 hours only to such an extent of "obliquely recognizable".

Figure 8:
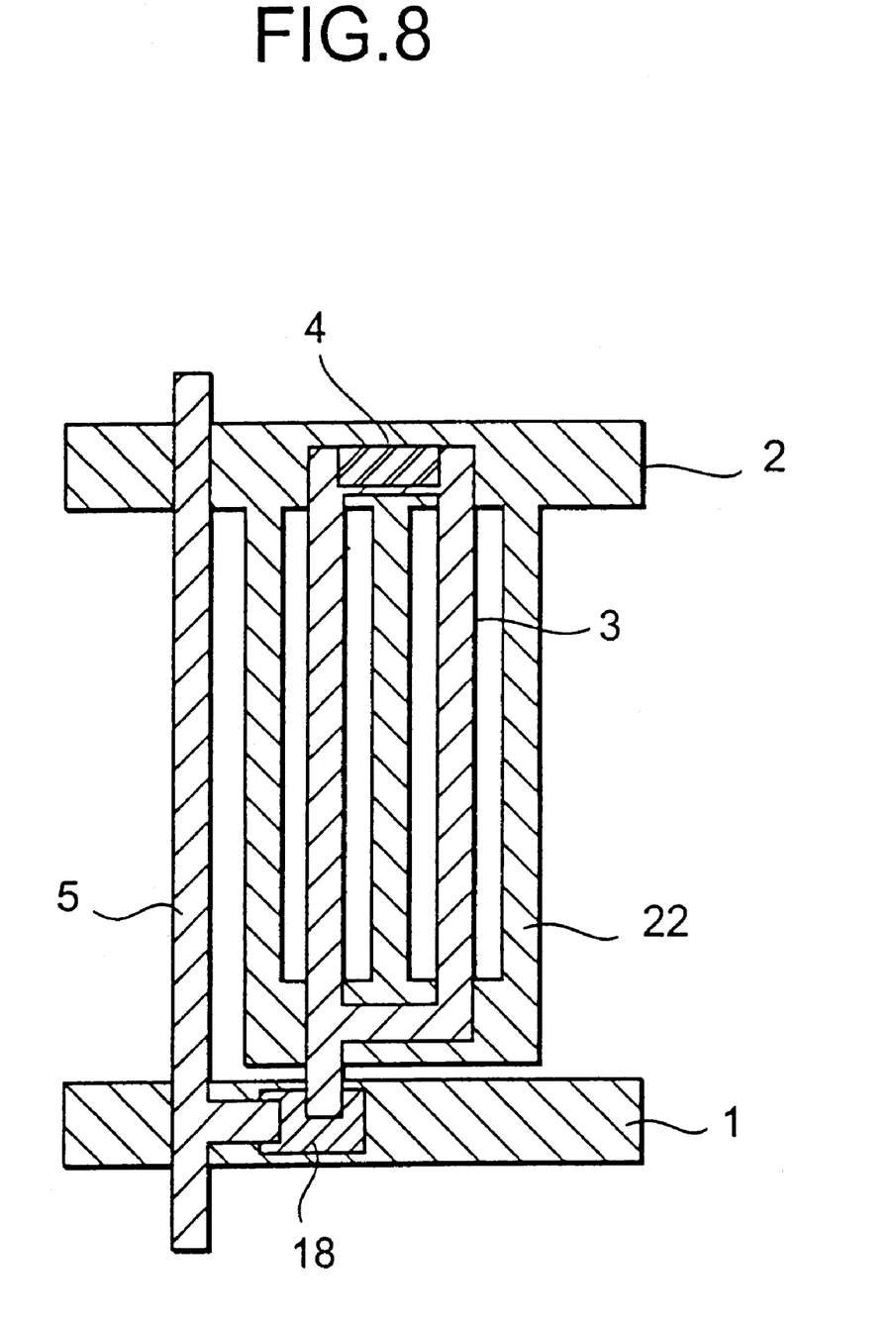
FIG. 8 is a plan view showing an electrode structure within a unit pixel of an active matrix liquid crystal display device according to a second embodiment of the present invention.

FIG. 8 shows a second embodiment of the present invention. As compared to the first embodiment, this embodiment is common in that the spacer contact portion 4 is located over the common electrode wire 2, and is different in that the pixel electrode 3 is extended up to over the common electrode wire 2 and the spacer contact portion 4 is located over the thus extended portion of the pixel electrode. By adopting such a structure, an electric charge Q, to be accumulated when a certain pattern is displayed for a long time in the bright state, is determined to be zero as shown by the following equation (4) since V1=V2=0, so that no long-term afterimage phenomena are caused:

$$Q=1/(1/C1+1/C2) \times (V1-V2)=1/(1/C1+1/C2) \times (0-0)=0 \ [C] \quad (4).$$

Figure 9:
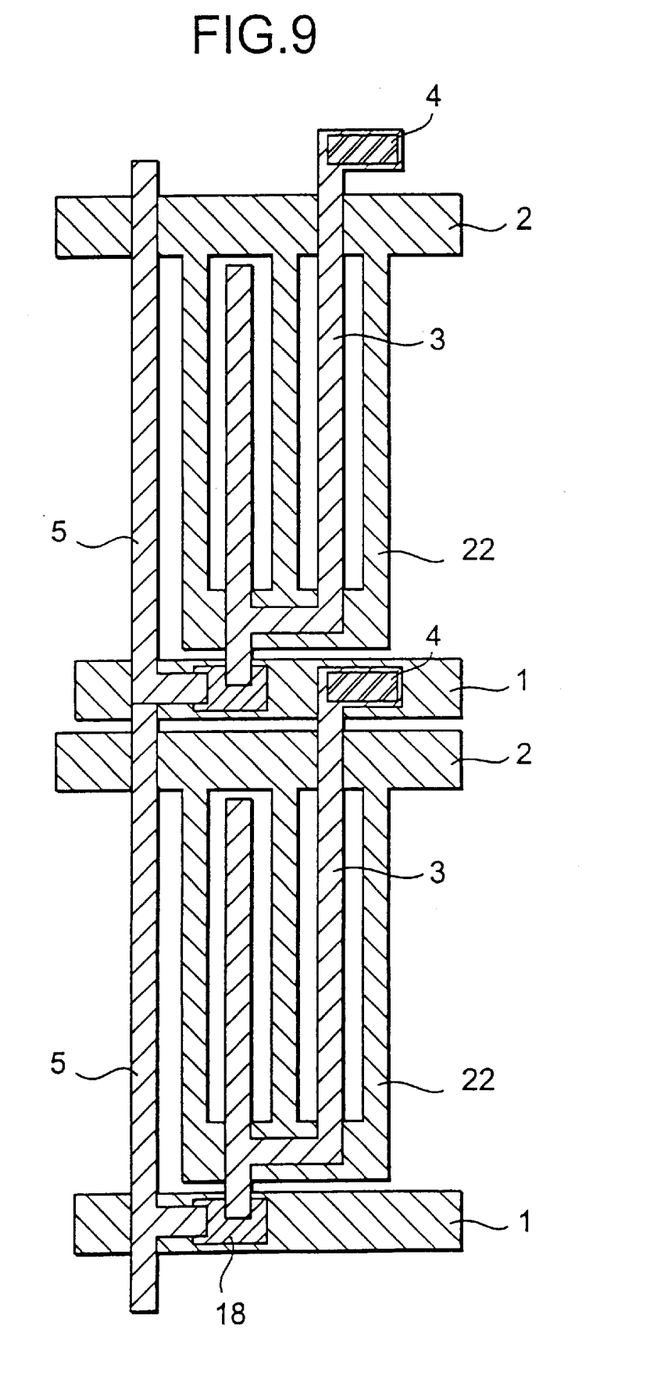
FIG. 9 is a plan view showing an electrode structure within a unit pixel of an active matrix liquid crystal display device according to a third embodiment of the present invention.

FIG. 9 shows a third embodiment according to the present invention. As compared to the first embodiment, this embodiment is different in that the pixel electrode 3 is extended up to over the gate electrode wire 1 at a preceding stage, and the spacer contact portion 4 is located over the thus extended portion of the pixel electrode 3. By adopting such a structure, an electric charge Q, to be accumulated when a certain pattern is displayed for a long time in the bright state, is determined to be zero as shown by the following equation (5), so that no long-term afterimage phenomena are caused:

$$Q=1/(1/C1+1/C2) \times (V1-V2)=1/(1/C1+1/C2) \times (0-0)=0 \ [C] \quad (5).$$

Furthermore, since the position of the protruded spacer is kept away from a display pixel surface, that disorder of alignment of liquid crystal which may be caused around the protruded spacer will not affect the displaying, to thereby provide an excellent displaying.

In the aforementioned embodiments, there has been mentioned a three-terminal switching element such as a TFT which is representative of a switching element in an AM-LCD. Without limited thereto, the present invention can be also applied when a two-terminal element such as a diode and varistor is adopted.

Furthermore, the protruded spacer formed on the color filter need not be formed in a color overlapped manner, and may be provided such as by patterning an overcoat.

As described above, according to the liquid crystal display device of the present invention, the position at which the top of the protruded spacer contacts the TFT substrate side is located over the common electrode or the extended portion of the pixel electrode, so that an electric charge to be otherwise accumulated between the pixel electrode and the common electrode becomes zero to thereby reduce the occurrence of a long-term afterimage phenomenon.

What is claimed is:

1. A liquid crystal display device of a latitudinal electric field type, comprising:

a first substrate provided with a scan line for controlling a switching element connected to a pixel electrode and a data line, a common electrode arranged parallel to said pixel electrode via insulating film, and a common electrode wire connected to said common electrode and extended in a direction intersecting said data line;

a second substrate disposed opposite said first substrate via liquid crystal layer; and a protruded spacer formed on at least one of said first substrate and said second substrate so as to fix a gap between said first substrate and said second substrate, said protruded spacer being located over at least one of said common electrode wire and said extended portion of said pixel electrode.

2. A liquid crystal display device of claim 1, wherein said common electrode is divided into a plurality of portions in a lattice shape and extended in a direction intersecting said common electrode wire; said pixel electrode is divided into a plurality of portions which are arranged to be located between said plurality of portions of said common electrode; and said protruded spacer is located over said common electrode wire only.

3. A liquid crystal display device of claim 1, wherein said common electrode is divided into a plurality of portions in a lattice shape and extended in a direction intersecting said common electrode wire; said pixel electrode is divided into a plurality of portions which are arranged to be located between said plurality of portions of said common electrode; said plurality of portions of said pixel electrode have those end portions thereof distal to said switching element which are extended up to over said common electrode wire and which are commonly connected to each other to thereby constitute an extended portion of said pixel electrode; and said protruded spacer is located over said extended portion only.

4. A liquid crystal display device of claim 1, wherein said common electrode is divided into a plurality of portions in a lattice shape and extended in a direction intersecting said common electrode wire; said pixel electrode is divided into a plurality of portions which are arranged to be located between said plurality of portions of said common electrode; said plurality of portions of said pixel electrode have that partial end portion thereof distal to said switching element which partial end portion is extended beyond said common electrode wire and up to over a scan line at a preceding stage to thereby constitute an extended portion of said pixel electrode; and said protruded spacer is located over said extended portion only over said scan line at said preceding stage.

5. A liquid crystal display device of claim 2, wherein an opposing area between said protruded spacer and said common electrode wire has a dimension which is narrower than a width of said common electrode wire and which is selected to be within an extent shorter than a distance between both outer sides of said pixel electrode.

6. A liquid crystal display device of claim 3, wherein an opposing area between said protruded spacer and said extended portion of said pixel electrode has a dimension which is narrower than a width of said common electrode wire and which is selected to be within an extent shorter than a length of said connected portion of said pixel electrode.

7. A liquid crystal display device of claim 4, wherein an opposing area between said protruded spacer and said extended portion of said pixel electrode has a dimension which is narrower than a width of said scan line at said preceding stage and which is selected to be within an extent shorter than a distance between both outer sides of said pixel electrode.

8. A liquid crystal display device of claim 1, wherein said second substrate is formed with color filter layers, and said protruded spacer is formed of a lamination of said color filters.

9. A liquid crystal display device of claim 8, wherein said scan line, said common electrode wire and said common electrode are formed on a common plane of said first substrate; said scan line and said common electrode wire extend in parallel with each other with interposing a pixel area therebetween; said data line and said pixel electrode are formed in a common plane on said insulating film; and said protruded spacer has a top contacted with an alignment film formed on said common electrode wire.

* * * * *